(12) United States Patent
Shiraishi

(10) Patent No.: US 11,507,780 B2
(45) Date of Patent: Nov. 22, 2022

(54) IMAGE ANALYSIS DEVICE, IMAGE ANALYSIS METHOD, AND IMAGE ANALYSIS PROGRAM

(71) Applicant: NEC CORPORATION, Tokyo (JP)

(72) Inventor: Soma Shiraishi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 38 days.

(21) Appl. No.: 16/977,521

(22) PCT Filed: Mar. 5, 2018

(86) PCT No.: PCT/JP2018/008405
§ 371 (c)(1),
(2) Date: Sep. 2, 2020

(87) PCT Pub. No.: WO2019/171440
PCT Pub. Date: Sep. 12, 2019

(65) Prior Publication Data
US 2020/0394460 A1 Dec. 17, 2020

(51) Int. Cl.
*G06K 9/62* (2022.01)
*G06V 10/25* (2022.01)
(Continued)

(52) U.S. Cl.
CPC .......... *G06K 9/6256* (2013.01); *G06K 9/628* (2013.01); *G06K 9/6215* (2013.01); *G06V 10/25* (2022.01); *G06V 10/40* (2022.01); *G06V 20/00* (2022.01)

(58) Field of Classification Search
CPC ............... G06K 9/3233; G06K 9/6255; G06K 9/00624; G06K 9/6215; G06K 9/628;
(Continued)

(56) References Cited

U.S. PATENT DOCUMENTS

2009/0304251 A1* 12/2009 Zheng .................... G06V 10/25
382/131
2012/0087574 A1* 4/2012 Yokono ................ G06V 40/172
382/159
(Continued)

FOREIGN PATENT DOCUMENTS

JP 2009-116385 A 5/2009
JP 2009116385 A * 5/2009 ........... G06K 9/6228
(Continued)

OTHER PUBLICATIONS

Karen Simonyan et al., "Very Deep Convolutional Networks for Large-Scale Image Recognition", pp. 1-14, ICLR 2015.
(Continued)

*Primary Examiner* — Pinalben Patel
(74) *Attorney, Agent, or Firm* — Sughrue Mion, PLLC

(57) ABSTRACT

An image analysis device 10 includes: a generation unit 11 which generates a similar set, which is a set of similar pieces of learning data selected from among a plurality of pieces of learning data, each including an image and information that represents an object to be recognized that is displayed in the image; and a learning unit 12 which uses the generated similar set to learn parameters for a predetermined recognition model that allow the predetermined recognition model to recognize the object to be recognized that is displayed in each image included in the generated similar set.

20 Claims, 8 Drawing Sheets

(51) Int. Cl.
*G06V 10/40* (2022.01)
*G06V 20/00* (2022.01)

(58) Field of Classification Search
CPC ...... G06K 9/6256; G06K 9/6262; G06K 9/46; G06T 7/00
See application file for complete search history.

(56) References Cited

U.S. PATENT DOCUMENTS

| | | | | |
|---|---|---|---|---|
| 2014/0016822 | A1* | 1/2014 | Sakamoto | G06V 20/00 382/103 |
| 2015/0071529 | A1* | 3/2015 | Yokoi | G06K 9/6256 382/159 |
| 2016/0078284 | A1* | 3/2016 | Sato | G06K 9/6271 382/118 |
| 2016/0171346 | A1* | 6/2016 | Han | G06V 10/44 382/103 |
| 2021/0104071 | A1* | 4/2021 | Shao | G06N 3/04 |
| 2021/0174129 | A1* | 6/2021 | Iwamoto | G06V 10/40 |
| 2022/0044949 | A1* | 2/2022 | Korb | G06K 9/6215 |

FOREIGN PATENT DOCUMENTS

| | | |
|---|---|---|
| JP | 2012-083938 A | 4/2012 |
| JP | 2016-062253 A | 4/2016 |
| JP | 2017-156886 A | 9/2017 |

OTHER PUBLICATIONS

David G. Lowe, "Distinctive Image Features from Scale-Invariant Keypoints", International Journal of Computer Vision, 2004, pp. 91-110, vol. 60, No. 2.
Andrew Y. NG et al., "On Spectral Clustering: Analysis and an algorithm", In Advances in Neural Information Processing Systems 14, 2001, pp. 1-8.
Bolei Zhou et al., "Learning Deep Features for Discriminative Localization", Proc CVPR, 2016, pp. 2921-2929.
Kuwabara, Shutaro et al., "Fine-grained 3D Model Retrieval by using Hand-Drawn Sketch" Proceedings of Visual/Media Computing Conference 2017, Jun. 24, 2017, pp. 8-15.
International Search Report of PCT/JP2018/008405 dated Jun. 5, 2018 [PCT/ISA/210].

* cited by examiner

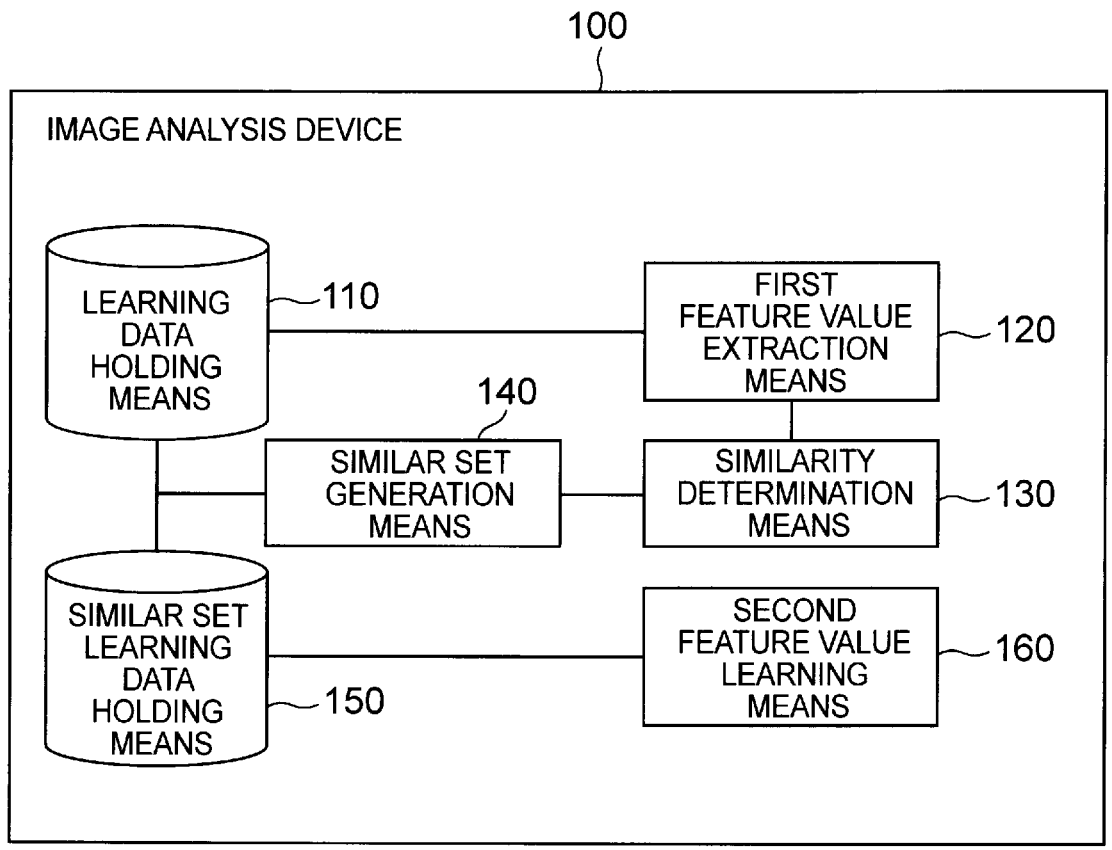

IMAGE ANALYSIS DEVICE, IMAGE ANALYSIS METHOD, AND IMAGE ANALYSIS PROGRAM

CROSS REFERENCE TO RELATED APPLICATIONS

This application is a National Stage of International Application No. PCT/JP2018/008405, filed Mar. 5, 2018.

TECHNICAL FIELD

The present invention relates to an image analysis device, an image analysis method, and an image analysis program.

BACKGROUND ART

Typical object recognition technologies of recognizing target objects in images acquired by imaging devices such as cameras are developed. For example, Non Patent Literature (NPL) 1 describes an object recognition technology of performing learning and discrimination using a multi-layer neural network.

In the learning in the object recognition technology described in NPL 1, a feature value effective for discrimination is extracted from among feature values representing the appearance of a target object. In the discrimination in the object recognition technology described in NPL 1, the same type of feature value as the feature value extracted in the learning is extracted from an image in which a target object whose belonging category is unknown is displayed.

Following this, on the basis of the feature value extracted from the image in which the target object whose belonging category is unknown is displayed and the learning result, a score or probability indicating the category to which the target object belongs is specified.

The learning in the object recognition technology described in NPL 1 has the following problem: In the case where there are many categories, it is difficult to obtain a feature value effective for discriminating a category similar to the category to which the target object belongs, as compared with a category not similar to the category to which the target object belongs. If a feature value effective for discriminating a similar category cannot be obtained, the target object recognition rate decreases.

To solve such a problem, Patent Literature (PTL) 1 describes an image discrimination device capable of correctly recognizing an object even in the case where a plurality of model images are similar. The image discrimination device described in PTL 1 recognizes an object by a feature point matching method described below.

The image discrimination device described in PTL 1 extracts feature points and feature values from an image stored in a database beforehand. The image discrimination device described in PTL 1 also extracts feature points and feature values from a discrimination target image, by the same method as the method of extraction from the image stored in the database.

In the case where the similarity between a feature value obtained from the image stored in the database and a feature value obtained from the discrimination target image is greater than or equal to a predetermined value, the image discrimination device described in PTL 1 associates the feature points for which the feature values have been extracted. On the basis of the association result, the image discrimination device described in PTL 1 discriminates an object displayed in the discrimination target image.

The image discrimination device described in PTL 1 weights the association result using, from among the feature points obtained from the discrimination target image, a feature point having a low correlation with a category similar to a category to which the object displayed in the discrimination target image belongs.

By weighting the association result, the image discrimination device described in PTL 1 can accurately distinguish a category similar to the category to which the object displayed in the discrimination target image belongs. Thus, the image discrimination device described in PTL 1 can improve the target object recognition rate.

NPL 2 describes an approach called scale invariant feature transform that extracts a feature point called "keypoint" from an image and computes "feature value description".

NPL 3 describes a graph's Laplacian. NPL 4 describes a class activation mapping technique that can improve position detection accuracy without significant loss of object classification accuracy.

CITATION LIST

Patent Literature

PTL 1: Japanese Patent Application Laid-Open No. 2009-116385

Non Patent Literature

NPL 1: Karen Simonyan, and Andrew Zisserman, "Very Deep Convolutional Networks for Large-Scale Image Recognition," In ICLR, 2015.

NPL 2: David G Lowe, "Distinctive Image features from Scale-Invariant Keypoints," International Journal of Computer Vision, 2004, 60(2), pages 91-110.

NPL 3: Andrew Y. Ng, Michale I. Jordan, and Yair Weiss, "On Spectral Clustering: Analysis and an algorithm," In Advances in Neural Information Processing Systems 14, 2001.

NPL 4: B. Zhou, A. Khosla, A. Lapedriza, A. Oliva, and A. Torralba, "Learning Deep Features for Discriminative Localization," Proc CVPR, 2016.

SUMMARY OF INVENTION

Technical Problem

The method of weighting the association result described in PTL 1 is not applicable to methods other than the feature point matching method. Moreover, the recognition method of extracting feature points and assigning weights causes heavy load. There is thus a need for a method that can recognize a target object displayed in an image more easily.

To solve the problem stated above, the present invention has an object of providing an image analysis device, an image analysis method, and an image analysis program that can recognize an object to be recognized displayed in an image more easily with high accuracy.

Solution to Problem

An image analysis device according to the present invention includes: a generation unit which generates a similar set, which is a set of similar pieces of learning data selected from among a plurality of pieces of learning data, each including an image and information that represents an object to be recognized that is displayed in the image; and a learning unit which uses the generated similar set to learn parameters for a predetermined recognition model that allow the predetermined recognition model to recognize the object to be recognized that is displayed in each image included in the generated similar set.

An image analysis method according to the present invention includes: generating a similar set, which is a set of similar pieces of learning data selected from among a plurality of pieces of learning data, each including an image and information that represents an object to be recognized that is displayed in the image; and using the generated similar set to learn parameters for a predetermined recognition model that allow the predetermined recognition model to recognize the object to be recognized that is displayed in each image included in the generated similar set.

An image analysis program according to the present invention causes a computer to execute: a generation process of generating a similar set, which is a set of similar pieces of learning data selected from among a plurality of pieces of learning data, each including an image and information that represents an object to be recognized that is displayed in the image; and a learning process of using the generated similar set to learn parameters for a predetermined recognition model that allow the predetermined recognition model to recognize the object to be recognized that is displayed in each image included in the generated similar set.

Advantageous Effects of Invention

According to the present invention, it is possible to recognize an object to be recognized displayed in an image more easily with high accuracy.

BRIEF DESCRIPTION OF DRAWINGS

FIG. 1 is a block diagram showing an example of a structure of Exemplary Embodiment 1 of an image analysis device according to the present invention.

FIG. 2 is an explanatory diagram showing an example of a matrix representing similarity between categories in Exemplary Embodiment 1.

DESCRIPTION OF EMBODIMENT

Exemplary Embodiment 1

[Description of Structure]

Figure 3:
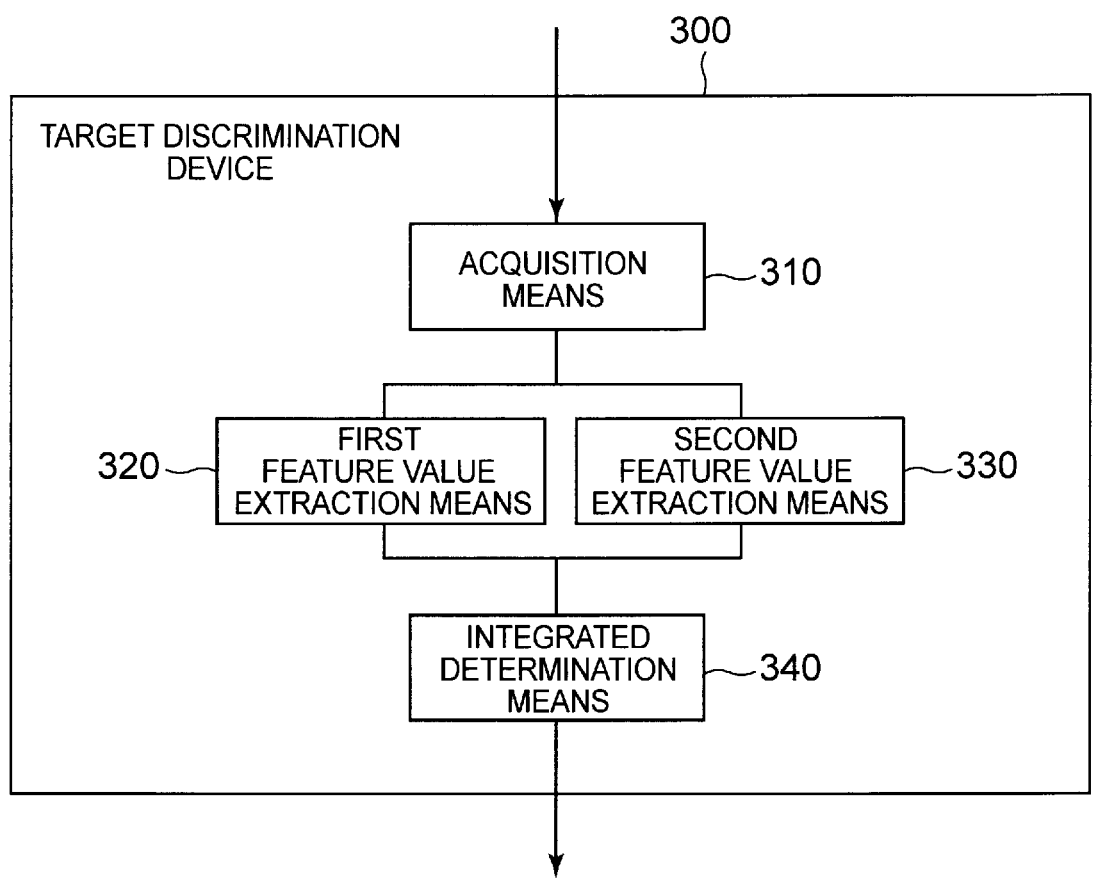
FIG. 3 is a block diagram showing an example of a structure of a target discrimination device 300.

An exemplary embodiment of the present invention will be described below, with reference to drawings. FIG. 1 is a block diagram showing an example of a structure of Exemplary Embodiment 1 of an image analysis device according to the present invention. An image analysis device 100 shown in FIG. 1 is a device that provides a feature value learning technology.

FIG. 1 is a diagram intended to help understanding of the structure of the image analysis device according to Exemplary Embodiment 1, and the structure of the image analysis device according to Exemplary Embodiment 1 is not limited to the structure shown in FIG. 1.

The image analysis device 100 shown in FIG. 1 includes a learning data holding means 110, a first feature value extraction means 120, a similarity determination means 130, a similar set generation means 140, a similar set learning data holding means 150, and a second feature value learning means 160.

The learning data holding means 110 has a function of holding learning data which is data used for learning a recognition model. For example, the learning data holding means 110 holds pairs of images and labels indicating categories to which target objects displayed in the images belong, as the learning data.

Examples of the images held in the learning data holding means 110 include RGB images, grey scale images, and infrared images. The learning data holding means 110 may hold other types of images.

The learning data holding means 110 may hold, instead of the foregoing pairs, pairs of numeric values and labels indicating categories to which target objects indicated by the numeric values belong, as the learning data. This exemplary embodiment describes an example in which the learning data holding means 110 holds images.

The first feature value extraction means 120 has a function of extracting a feature value (hereafter referred to as "first feature value") from each image held in the learning data holding means 110. For example, the first feature value extraction means 120 may extract a feature value representing the appearance of a target object as the first feature value, as in the method described in NPL 1. The first feature value extraction means 120 may extract the first feature value using the feature point matching described in NPL 2.

The similarity determination means 130 has a function of determining similarity between the images held in the learning data holding means 110, on the basis of the first feature value extracted by the first feature value extraction means 120 for each image held in the learning data holding means 110.

To determine the similarity between the images held in the learning data holding means 110, for example, the similarity determination means 130 uses a method of determining similarity on the basis of a distance in a feature space computed from the first feature values.

The similarity determination means 130 also has a function of determining similarity between the categories to which the target objects displayed in the images held in the learning data holding means 110 belong. For example, the similarity determination means 130 executes a discrimination process on the images held in the learning data holding means 110, on the basis of the first feature values extracted by the first feature value extraction means 120. On the basis of the result of executing the discrimination process, the similarity determination means 130 determines the similarity between the categories.

For example, the similarity determination means 130 may use any of the following methods to determine the similarity between the categories to which the target objects displayed in the images belong.

<First Inter-Category Similarity Determination Method>

Each image that is held in the learning data holding means 110 and in which a target object belonging to an ith category $C_i$ from among M types of categories is displayed is denoted as $x \in C_i$.

Let $p_{cj}(x)$ be the resemblance to a category $C_j=1, \ldots, M$ obtained on the basis of a first feature value extracted from the image x by the first feature value extraction means 120 and a discriminator learned beforehand. Then, an M×M matrix S having the following elements each as an (i,j) element is computed.

$$S_{i,j} = \Sigma_{x \in Ci}\{p_{cj}(x)\} \quad \text{Formula (1)}.$$

The discriminator used when computing the matrix S is, for example, a logistic regression discriminator. Using the matrix S, the following matrix D is computed.

$$D=(S+S^T)/2 \quad \text{Formula (2)}.$$

An (i,j) element of the matrix D in Formula (2) represents the similarity between the category $C_i$ and the category $C_j$. An example of the matrix D computed by this method is shown in FIG. 2. FIG. 2 is an explanatory diagram showing an example of a matrix representing similarity between categories in Exemplary Embodiment 1.

The matrix D shown in FIG. 2 is a matrix where M=3. In FIG. 2, A to C represent category types. For example, the similarity between the category A and the category B is "0.3", as shown in FIG. 2. With this method, the similarity determination means 130 can determine the similarity between the categories.

<Second Inter-Category Similarity Determination Method>

The similarity determination means 130 performs matching between an image in which a target object belonging to a predetermined category is displayed and an image in which a target object belonging to a category other than the predetermined category is displayed, using, for example, the feature point matching described in NPL 2.

In the case of obtaining a feature point at which the degree of matching is greater than or equal to a predetermined threshold, the similarity determination means 130 can determine that the predetermined category is similar to the other category.

The similar set generation means 140 has a function of generating a similar set for pairs held in the learning data holding means 110. For example, the similar set generation means 140 generates, on the basis of the similarity between images obtained by the similarity determination means 130, a similar set of images.

A similar set of images is generated, for example, using the distance between a first feature value extracted by the first feature value extraction means 120 from a predetermined image held in the learning data holding means 110 and a first feature value extracted by the first feature value extraction means 120 from an image held in the learning data holding means 110 other than the predetermined image. The similar set generation means 140 generates a set of images the distance between which is less than a threshold, as a similar set of images.

For example, the similar set generation means 140 computes, for each image held in the learning data holding means 110, the distance between the first feature value extracted by the first feature value extraction means 120 and the first feature value extracted by the first feature value extraction means 120 from the predetermined image held in the learning data holding means 110.

The similar set generation means 140 then selects any number of images in ascending order of the computed distance, where the number is 1 or more. The similar set generation means 140 may thus generate a set including the predetermined image and the selected image(s), as a similar set of images.

Moreover, the similar set generation means 140 generates a similar set of categories on the basis of the similarity between categories to which displayed target objects belong, the similarity being obtained by the similarity determination means 130. For example, the similar set generation means 140 determines the similarity between categories on the basis of any of the foregoing inter-category similarity determination methods.

The similar set generation means 140 then generates a similar set of categories on the basis of the determined similarity between categories. A similar set of categories may be generated by the following method.

<Method of Generating Similar Set of Categories>

The similar set generation means 140 applies the spectral clustering described in NPL 3 to the M×M matrix D representing the similarities between all M types of categories, to classify the M types of categories into K sets (K is the number of clusters).

The similar set generation means 140 regards the categories included in each obtained set as similar categories, and generates the set as a similar set of categories.

The similar set generation means 140 may apply clustering using u clusters, e.g. $K_1, K_2, \ldots, K_u$. With use of the u clusters, the M types of categories are classified into similar sets of categories hierarchically.

The similar set learning data holding means 150 has a function of holding similar set learning data, on the basis of the learning data held in the learning data holding means 110, the similarity determined by the similarity determination means 130, and the similar set generated by the similar set generation means 140.

The similar set learning data is, for example, a set of learning data held in the learning data holding means 110, which is based on the similar set generated by the similar set generation means 140. The similar set learning data may include the similarity determined by the similarity determination means 130.

The similar set learning data may be a set including an image held in the learning data holding means 110, a label indicating a correct category, and a label indicating a category similar to the correct category, which is based on the similar set of categories generated by the similar set generation means 140. Herein, the correct category is the category to which the target object displayed in the image belongs.

The second feature value learning means 160 has a function of learning a second feature value on the basis of the similar set learning data held in the similar set learning data holding means 150. The second feature value is a feature value obtained in order to recognize similar images or similar categories with high accuracy.

The second feature value is, for example, a parameter of a recognition model such as a multi-layer neural network. For example, the second feature value learning means 160 learns the second feature value by any of the following methods.

<Second Feature Value Learning Method 1>

The second feature value learning means 160 uses, for example, a multi-layer neural network. It is assumed here that the similar set learning data holding means 150 holds each similar set of images generated by the similar set generation means 140.

The second feature value learning means 160 updates weights in the multi-layer neural network. For example, the second feature value learning means 160 updates the weights so as to increase the distance between respective first feature values obtained from a pair of images included in a similar set of images held in the similar set learning data holding means 150 and relating to different categories, which is input to the multi-layer neural network.

The second feature value learning means 160 also updates the weights so as to decrease the distance between respective first feature values obtained from a pair of images included in a similar set of images held in the similar set learning data holding means 150 and relating to the same category, which is input to the multi-layer neural network.

The second feature value learning means 160 performs learning of setting, as the second feature value, the value of an intermediate layer in the multi-layer neural network obtained by updating the weights.

<Second Feature Value Learning Method 2>

The second feature value learning means 160 may perform, for example, the following learning in the case where the similar set learning data holding means 150 holds a similar set of categories for each image.

In the case of performing learning intended to discriminate all M categories, the second feature value learning means 160 inputs the image x in which the target object belonging to the category $C_i$ is displayed, to the multi-layer neural network described in NPL 1. As a result of inputting the image x, the second feature value learning means 160 obtains a score $y(x)=[y_1(x), y_2(x), y_M(x)]$ for each category.

The second feature value learning means 160 then computes $y_w(x)$ using a weight $w=[s_{Ci}(C_1), s_{Ci}(C_2), s_{Ci}(C_M)]$, as follows.

$$y_w(x)=y(x)*w \quad \text{Formula (3).}$$

In Formula (3), "*" denotes the product for each element. $s_{Ci}(C_j)$ is a scalar value indicating the degree of similarity of the category $C_j$ to the category $C_i$. For example, $s_{Ci}(C_j)$ is expressed as follows.

[Math. 1]

$$s_{c_i}(C_j) = \begin{cases} 1 & \text{if } C_i \text{ and } C_j \text{ are similar set} \\ 0 & \text{otherwise} \end{cases} \quad \text{Formula (4)}$$

That is, $s_{Ci}(C_j)$ represents the similarity between categories.

The second feature value learning means 160 computes softmax cross entropy loss using $y_w(x)$, and learns the parameter of the multi-layer neural network by updating the parameter so as to decrease the loss.

The second feature value learning means 160 also computes weighted_softmax using $y(x)$ and w, as follows.

$$\text{weighted\_softmax}(y(x))=w*\exp(y(x)) \quad \text{Formula (5).}$$

The second feature value learning means 160 further computes the following Loss, where t is a label vector such that the ith element corresponding to the category $C_j$ to which the target object displayed in the image x belongs is 1 and the elements other than the ith element are 0.

[Math. 2]

$$\text{Loss}(t, x) = -\sum_{j}^{M} t_j * \log(\text{weighted\_softmax}(y(x)j)) \quad \text{Formula (6)}$$

The second feature value learning means 160 may learn the parameter by updating the parameter based on the loss "Loss" computed according to Formula (6). In the case where u hierarchical similar sets are generated in the generation of similar sets of categories, the second feature value learning means 160 may learn u parameters of the multi-layer neural network corresponding to the respective layers.

<Second Feature Value Learning Method 3>

The second feature value learning means 160 may perform, for example, the following learning.

First, the second feature value learning means 160 selects Z images $x_1, x_2, \ldots x_z$ and Z label vectors $l_1, l_2, \ldots, l_z$, from learning data included in the same similar set learning data or learning data belonging to categories included in the same similar set learning data.

The second feature value learning means 160 then newly generates images and label vectors using ratios $r_1, r_2, \ldots, r_z$, as follows.

[Math. 3]

$$x = \sum_{i=1}^{Z} r_i \cdot x_i \quad \text{Formula (7)}$$

$$l = \sum_{i=1}^{Z} r_i \cdot l_i \left( \sum_{i=1}^{z} r_i = 1 \right)$$

The ratios used here may be selected randomly. The second feature value learning means 160 performs the generation of an image and a label vector a plurality of times. The second feature value learning means 160 may learn the parameter of the multi-layer neural network by using, as input data and label data during learning, new learning data including the generated images and label vectors.

A device for discriminating a target object using the second feature value learned by the image analysis device 100 according to this exemplary embodiment is shown in FIG. 3. FIG. 3 is a block diagram showing an example of a structure of a target discrimination device 300. The target discrimination device 300 shown in FIG. 3 discriminates a target object using a second feature value learned by the image analysis device 100 according to this exemplary embodiment.

The target discrimination device 300 shown in FIG. 3 includes an acquisition means 310, a first feature value extraction means 320, a second feature value extraction means 330, and an integrated determination means 340.

The acquisition means 310 has a function of acquiring image information or sound information of a recognition target indicating a target object. The acquisition means 310 acquires the information of the recognition target from a sensor such as an RGB camera, a depth camera, an infrared camera, or a microphone. The acquisition means 310 inputs the acquired information of the recognition target to the first feature value extraction means 320.

The acquisition means 310 also has a function of acquiring a learned second feature value from the image analysis device 100. The acquisition means 310 inputs the acquired second feature value to the second feature value extraction means 330.

The first feature value extraction means 320 has the same function as the first feature value extraction means 120 in this exemplary embodiment. In detail, the first feature value extraction means 320 extracts a first feature value from the information of the recognition target acquired by the acquisition means 310. The first feature value extraction means 320 inputs the extracted first feature value to the integrated determination means 340.

The second feature value extraction means 330 has a function of generating a recognition model (e.g. discriminator) using the input second feature value. The second feature value extraction means 330 inputs the generated recognition model to the integrated determination means 340.

The integrated determination means 340 has a function of performing recognition on the information of the recognition target using the input first feature value and recognition model.

The integrated determination means 340 obtains, for each category, the probability of the target object belonging to the category, for example from the discriminator generated beforehand on the basis of the second feature value. The integrated determination means 340 then recognizes the target object on the basis of the probability obtained from the discriminator.

The second feature value extraction means 330 generates the discriminator beforehand, using the second feature value (e.g. [aaaabbbb]) combining a feature value A (e.g. [aaaa]) and a feature value B (e.g. [bbbb]). The integrated determination means 340 may then recognize the target object using the generated discriminator. After the recognition, the integrated determination means 340 outputs the recognition result.

[Description of Operation]

Figure 4:
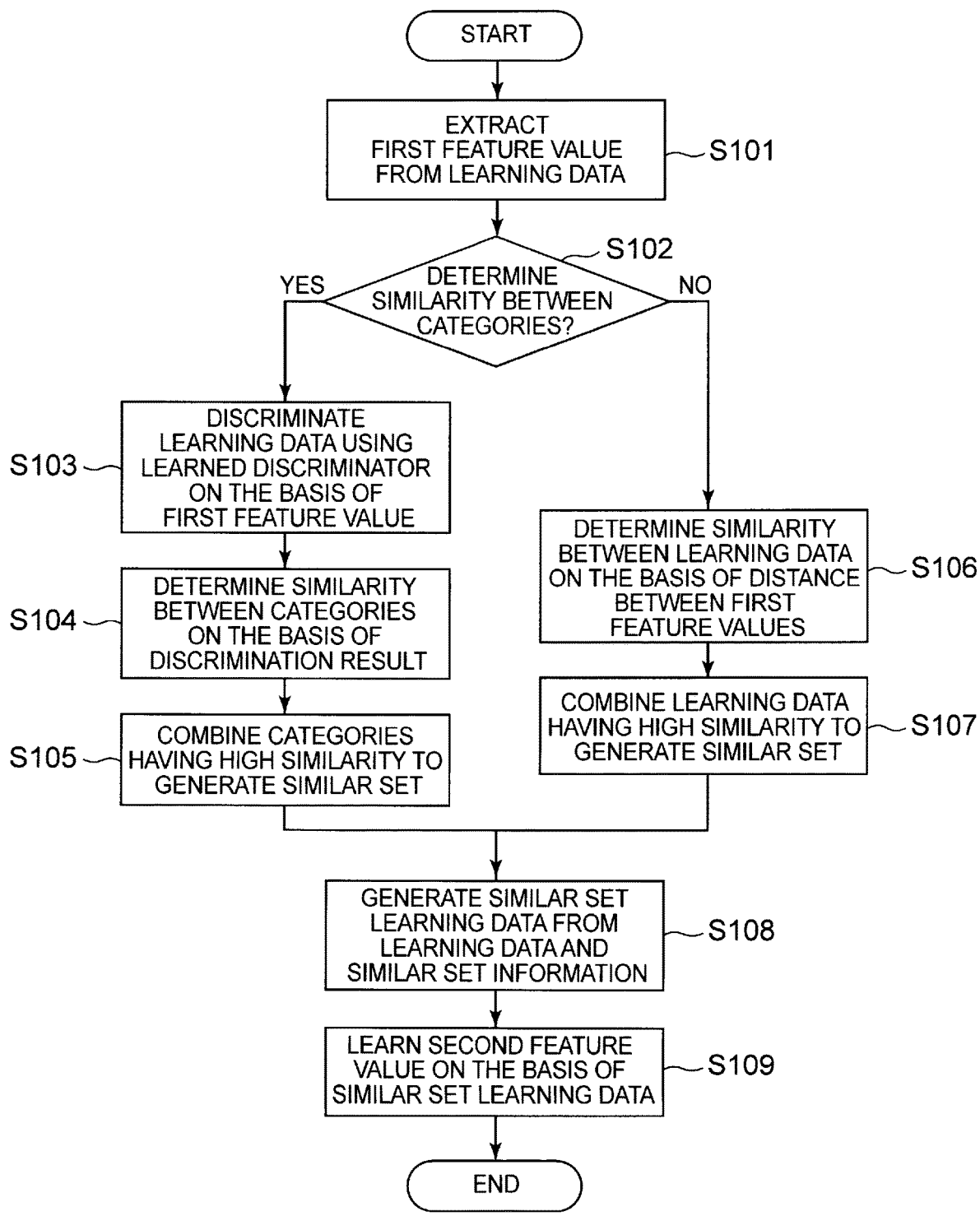
FIG. 4 is a flowchart showing operation of a feature value learning process by an image analysis device 100 according to Exemplary Embodiment 1.

Operation of learning a feature value by the image analysis device 100 according to this exemplary embodiment will be described below, with reference to FIG. 4. FIG. 4 is a flowchart showing operation of a feature value learning process by the image analysis device 100 according to Exemplary Embodiment 1.

The first feature value extraction means 120 extracts a first feature value from each piece of learning data held in the learning data holding means 110 (step S101). The first feature value extraction means 120 inputs the extracted first feature value to the similarity determination means 130.

Next, the similarity determination means 130 determines whether to determine similarity between categories (step S102). In the case of determining similarity between categories (step S102: Yes), the similarity determination means 130 discriminates each piece of learning data using a discriminator learned beforehand, on the basis of the input first feature value (step S103).

Next, the similarity determination means 130 determines similarity between categories included in pieces of learning data, on the basis of the discrimination result for each piece of learning data obtained in step S103 (step S104). Here, the discrimination result for each piece of learning data is output from the discriminator. The similarity determination means 130 inputs the determined similarity to the similar set generation means 140.

Next, the similar set generation means 140 combines categories having high similarity into one set to generate a similar set of categories, on the basis of the input similarity between categories (step S105). After generating the similar set of categories, the image analysis device 100 performs the process of step S108.

In the case of not determining similarity between categories (step S102: No), the similarity determination means 130 selects a method of determining similarity between pieces of learning data (e.g. images).

The similarity determination means 130 determines similarity between pieces of learning data held in the learning data holding means 110, on the basis of the distance between their first feature values acquired in step S101 (step S106). The similarity determination means 130 inputs the determined similarity between pieces of learning data to the similar set generation means 140.

Next, the similar set generation means 140 combines pieces of learning data having high similarity into one set to generate a similar set of learning data, on the basis of the input similarity between pieces of learning data (step S107). After generating the similar set of learning data, the image analysis device 100 performs the process of step S108.

Next, the similar set learning data holding means 150 generates similar set learning data, on the basis of the learning data held in the learning data holding means 110 and the information of the similar set obtained in step S105 or S107 (step S108). The similar set learning data holding means 150 holds the generated similar set learning data.

Next, the second feature value learning means 160 learns a second feature value, on the basis of the similar set learning data held in the similar set learning data holding means 150 (step S109). After learning the second feature value, the image analysis device 100 ends the feature value learning process.

[Description of Effects]

The image analysis device 100 according to this exemplary embodiment includes: the learning data holding means 110 for holding learning data; the first feature value extraction means 120 for extracting a first feature value from the learning data; and the similarity determination means 130 for determining similarity between a plurality of pieces of data that are likely to be falsely recognized, on the basis of the extracted first feature value.

The image analysis device 100 according to this exemplary embodiment also includes: the similar set generation means 140 for generating a similar set on the basis of the similarity determined by the similarity determination means 130; and the similar set learning data holding means 150 for holding similar set learning data generated on the basis of the learning data and the similar set. The image analysis device 100 according to this exemplary embodiment also includes the second feature value learning means 160 for learning a second feature value on the basis of the similar set learning data.

The similar set generation means 140 in the image analysis device 100 according to this exemplary embodiment generates a set of images and a set of categories having high similarity and likely to be falsely recognized. Hence, feature values obtained in order to recognize similar images or similar categories with high accuracy can be learned.

Exemplary Embodiment 2

[Description of Structure]

Figure 5:
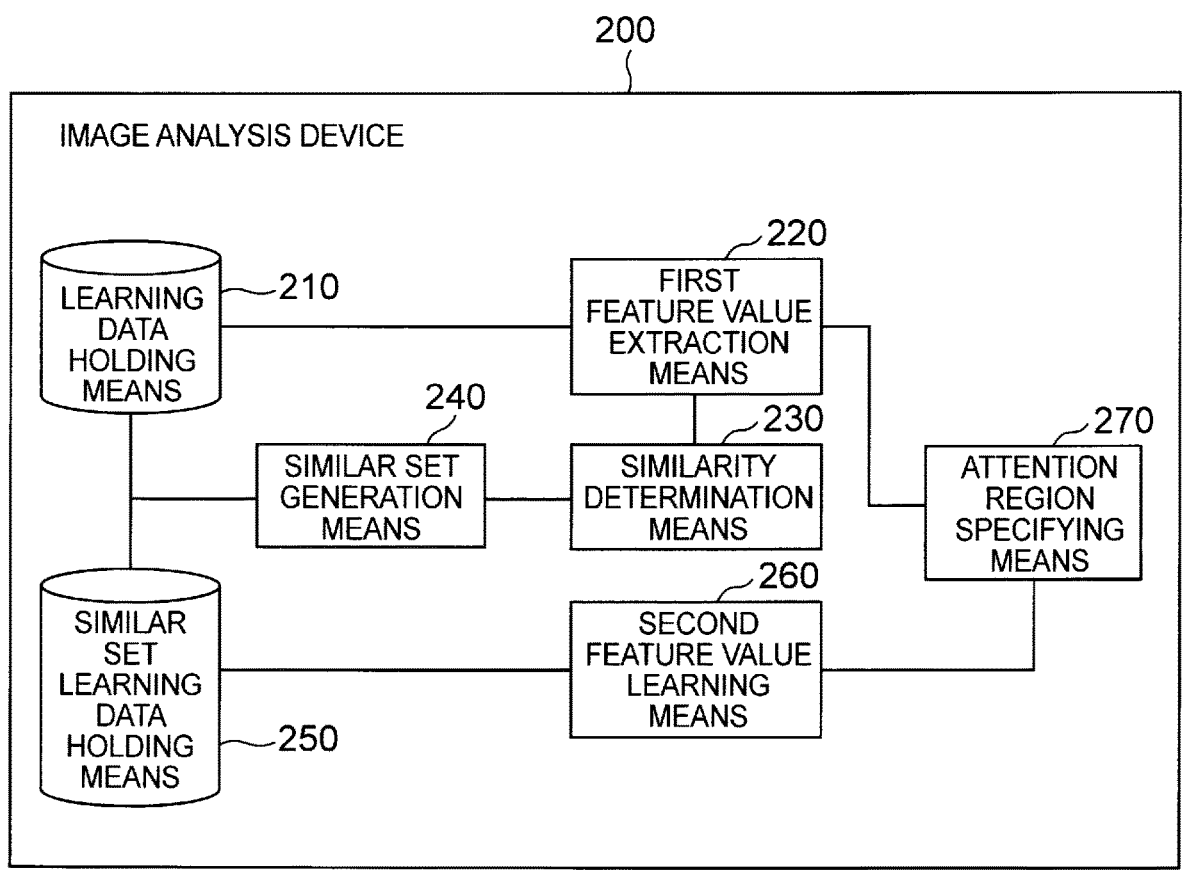
FIG. 5 is an explanatory diagram showing an example of a structure of Exemplary Embodiment 2 of an image analysis device according to the present invention.

Exemplary Embodiment 2 of the present invention will be described below, with reference to drawings. FIG. 5 is an explanatory diagram showing an example of a structure of Exemplary Embodiment 2 of an image analysis device according to the present invention. An image analysis device 200 shown in FIG. 5 is a device that provides a feature value learning technology.

FIG. 5 is a diagram intended to help understanding of the structure of the image analysis device according to Exemplary Embodiment 2, and the structure of the image analysis device according to Exemplary Embodiment 2 is not limited to the structure shown in FIG. 5.

The image analysis device 200 shown in FIG. 5 includes a learning data holding means 210, a first feature value extraction means 220, a similarity determination means 230, a similar set generation means 240, a similar set learning data holding means 250, a second feature value learning means 260, and an attention region specifying means 270.

The functions of the learning data holding means 210, the first feature value extraction means 220, the similarity determination means 230, the similar set generation means 240, and the similar set learning data holding means 250 are respectively the same as the functions of the learning data holding means 110, the first feature value extraction means 120, the similarity determination means 130, the similar set generation means 140, and the similar set learning data holding means 150 in Exemplary Embodiment 1.

The attention region specifying means 270 has a function of specifying an attention region that is a region in each image to which a discriminator pays attention in order to discriminate a category to which a target object displayed in the image belongs. The attention region specifying means 270 specifies an attention region, when an image held in the learning data holding means 210 is subjected to discrimination based on a first feature value extracted by the first feature value extraction means 220.

Figure 6:
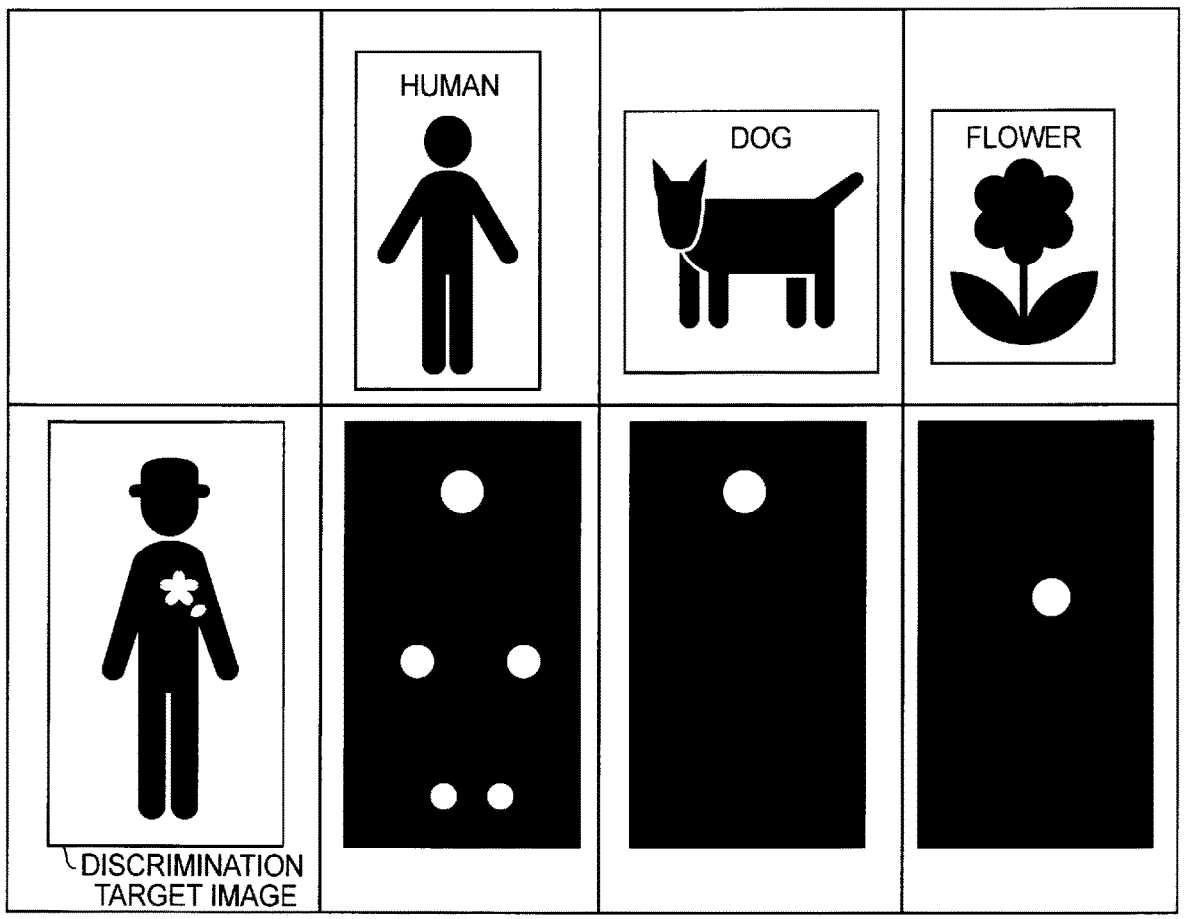
FIG. 6 is an explanatory diagram showing an example of attention regions specified by an attention region specifying means 270 according to Exemplary Embodiment 2.

FIG. 6 is an explanatory diagram showing an example of an attention region specified by the attention region specifying means 270 according to Exemplary Embodiment 2. Respective sample images of a human, a dog, and a flower are shown in the upper row in FIG. 6. That is, in the example shown in FIG. 6, the attention region specifying means 270 uses three categories "human", "dog", and "flower" as categories among which target objects are to be discriminated.

A human is displayed in a discrimination target image shown in FIG. 6. The attention region specifying means 270 specifies a face, hands, and feet as attention regions for recognizing that a human is displayed in the discrimination target image, as shown in the second column of the lower row in FIG. 6. White circles in FIG. 6 represent attention regions. Attention regions may be specified in sites other than a face, hands, and feet.

Moreover, the attention region specifying means 270 specifies a face as an attention region for recognizing that a dog is displayed in the discrimination target image in which a human is displayed, as shown in the third column of the lower row in FIG. 6. This is because human face and dog face are sites relatively similar between humans and dogs. An attention region may be specified in a site similar to that of dogs other than the face.

Moreover, the attention region specifying means 270 specifies a part with a flower pattern on clothes as an attention region for recognizing that a flower is displayed in the discrimination target image in which a human is displayed, as shown in the fourth column of the lower row in FIG. 6. An attention region may be specified in a part other than the part with the flower pattern. The attention region specifying means 270 holds information indicating an attention region (or attention regions, the same applies hereafter) specified for each category.

To specify an attention region, for example in discrimination by feature point matching, the attention region specifying means 270 extracts only the surroundings of a feature point at which matching with each category is successful.

In the case where a multi-layer neural network is used as the discriminator, the attention region specifying means 270 uses, for example, the technique described in NPL 4, as a method of determining a region to which the discriminator pays attention. With use of the technique described in NPL 4, the multi-layer neural network can specify, for each category, a position in an image contributing to output of the category at the time of discrimination.

The second feature value learning means 260 has a function of learning a second feature value using the similar set learning data holding means 250 and the attention region specifying means 270. For example, the second feature value learning means 260 can learn the second feature value on the basis of the similar set of categories held in the similar set learning data holding means 250 and the information indicating the attention region for each category held in the attention region specifying means 270.

Specifically, the second feature value learning means 260 performs learning, with an attention region common to each category included in the similar set of categories being excluded from the attention region of each category included in the similar set of categories.

Figure 7:
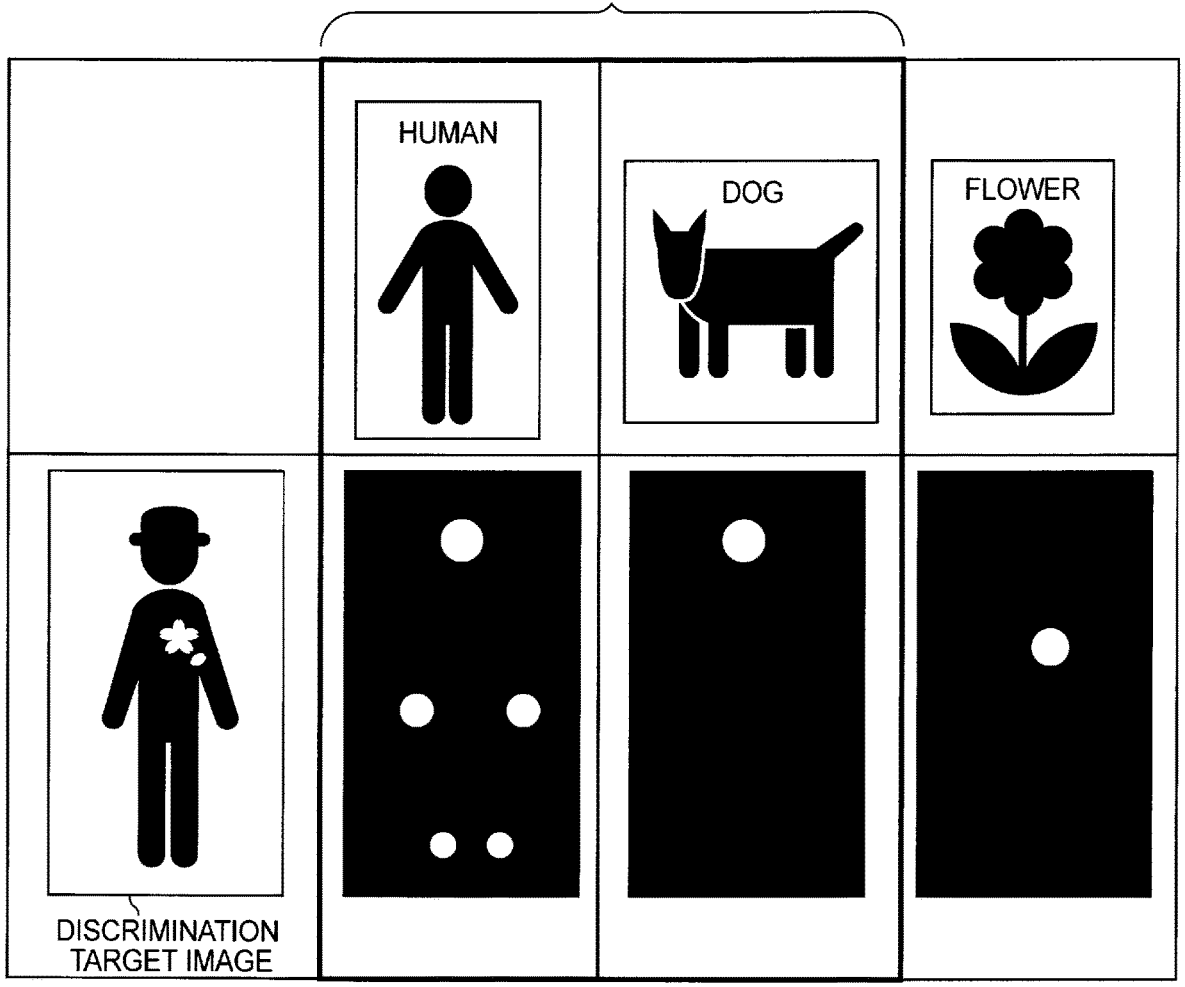
FIG. 7 is an explanatory diagram showing an example of learning using attention regions by a second feature value learning means 260 according to Exemplary Embodiment 2.

FIG. 7 is an explanatory diagram showing an example of learning using attention regions by the second feature value learning means 260 according to Exemplary Embodiment 2. In the example shown in FIG. 7, too, the second feature value learning means 260 uses three categories "human", "dog", and "flower" as categories among which target objects are to be discriminated.

Suppose the similar set generation means 240 generates beforehand a similar set to which two categories "human" and "dog" belong. For a discrimination target image in which a human is displayed in FIG. 7, the second feature value learning means 260 obtains an AND region which is an overlapping region between the attention regions for recognizing that a human is displayed in the discrimination target image and the attention region for recognizing that a dog is displayed in the discrimination target image.

In the example shown in FIG. 7, the obtained AND region is a face region which is a site relatively similar between humans and dogs. After obtaining the AND region, the second feature value learning means 260 fills the AND region with a predetermined pattern, as in a processed discrimination target image shown in FIG. 7. By filling the AND region with the predetermined pattern, the second feature value learning means 260 excludes the AND region from the learning target.

Alternatively, instead of filling the AND region with the predetermined pattern, the second feature value learning means 260 forcedly sets the second feature value obtained from the AND region to 0 or sets the probability corresponding to the degree of attention obtained from the AND region to 0.

After executing the foregoing process, the second feature value learning means 260 performs learning in the same way as in Exemplary Embodiment 1, using the other regions (e.g. body parts) in the processed discrimination target image. Since the AND region is excluded from the learning target, the second feature value learning means 260 can learn the second feature value obtained in order to discriminate the category to which the displayed target object belongs with higher accuracy.

The second feature value learned in this exemplary embodiment may also be used in the target discrimination device 300 shown in FIG. 3. The target discrimination device 300 can discriminate a target object by the same method as the discrimination method in Exemplary Embodiment 1.

[Description of Operation]

Figure 8:
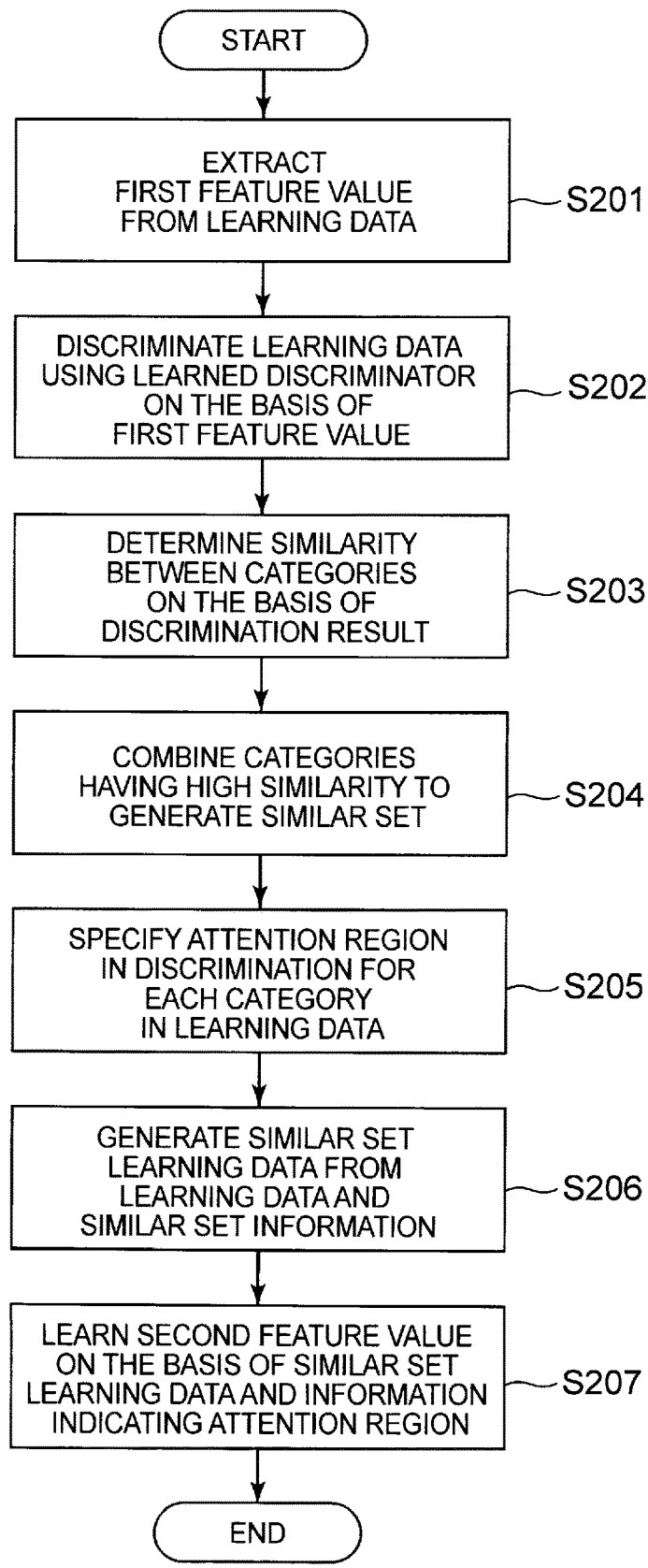
FIG. 8 is a flowchart showing operation of a feature value learning process by an image analysis device 200 according to Exemplary Embodiment 2.

Operation of learning a feature value by the image analysis device 200 according to this exemplary embodiment will be described below, with reference to FIG. 8. FIG. 8 is a flowchart showing operation of a feature value learning process by the image analysis device 200 according to Exemplary Embodiment 2.

The first feature value extraction means 220 extracts a first feature value from each piece of learning data held in the learning data holding means 210 (step S201). The first feature value extraction means 220 inputs the extracted first feature value to the similarity determination means 230.

Next, the similarity determination means 230 discriminates each piece of learning data using a discriminator learned beforehand, on the basis of the input first feature value (step S202).

Next, the similarity determination means 230 determines similarity between categories included in pieces of learning data, on the basis of the discrimination result for each piece of learning data obtained in step S202 (step S203). Here, the discrimination result for each piece of learning data is output from the discriminator. The similarity determination means 230 inputs the determined similarity to the similar set generation means 240.

Next, the similar set generation means 240 combines categories having high similarity into one set to generate a similar set of categories, on the basis of the input similarity between categories (step S204).

Next, the attention region specifying means 270 specifies an attention region that is a region to which the discriminator pays attention in the discrimination, for each category included in the learning data (step S205). The attention region specifying means 270 holds information indicating the specified attention region for each category.

Next, the similar set learning data holding means 250 generates similar set learning data, on the basis of the learning data held in the learning data holding means 210 and the information of the similar set generated by the similar set generation means 240 in step S204 (step S206). The similar set learning data holding means 250 holds the generated similar set learning data.

Next, the second feature value learning means 260 learns a second feature value, on the basis of the similar set learning data held in the similar set learning data holding means 250 and the information indicating the attention region held in the attention region specifying means 270 (step S207). After learning the second feature value, the image analysis device 200 ends the feature value learning process.

[Description of Effects]

The attention region specifying means 270 in the image analysis device 200 according to this exemplary embodiment specifies attention regions in images in which target objects belonging to similar categories are displayed. The second feature value learning means 260 then excludes an attention region common to the categories, as a result of which a part having greater difference is learned preferentially. Thus, the image analysis device 200 according to this exemplary embodiment can learn feature values effective for recognition of target objects displayed in images belonging to similar categories.

Figure 9:
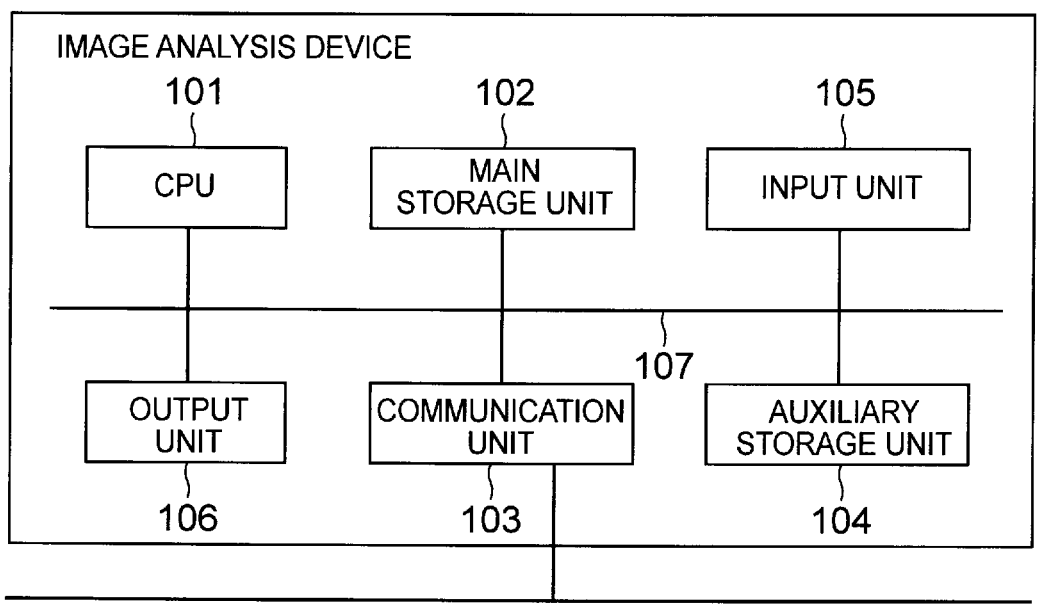
FIG. 9 is an explanatory diagram showing an example of a hardware structure of an image analysis device according to the present invention.

A specific example of a hardware structure of each of the image analysis devices 100 and 200 according to the exemplary embodiments will be described below. FIG. 9 is an explanatory diagram showing an example of a hardware structure of an image analysis device according to the present invention.

The image analysis device shown in FIG. 9 includes a central processing unit (CPU) 101, a main storage unit 102, a communication unit 103, and an auxiliary storage unit 104. The image analysis device may also include an input unit 105 for user operation and an output unit 106 for presenting processing results or the progress of processing to a user.

The main storage unit 102 is used as a work area for data or a temporary save area for data. The main storage unit 102 is, for example, random access memory (RAM).

The communication unit 103 has a function of performing data input and output with peripheral devices via a wire network or a wireless network (information communication network).

The auxiliary storage unit 104 is a non-transitory tangible storage medium. Examples of the non-transitory tangible storage medium include a magnetic disk, a magneto-optical disk, compact disk read only memory (CD-ROM), digital versatile disk read only memory (DVD-ROM), and semiconductor memory.

The input unit 105 has a function of inputting data and processing instructions. The input unit 105 is, for example, an input device such as a keyboard and a mouse.

The output unit 106 has a function of outputting data. The output unit 106 is, for example, a display device such as a liquid crystal display device or a printing device such as a printer.

In the image analysis device, each component is connected to a system bus 107, as shown in FIG. 9.

The auxiliary storage unit 104 stores, for example, a program for implementing the first feature value extraction means 120, the similarity determination means 130, the similar set generation means 140, the second feature value learning means 160, the first feature value extraction means 220, the similarity determination means 230, the similar set generation means 240, the second feature value learning means 260, and the attention region specifying means 270.

The main storage unit 102 is used, for example, as a storage area for the learning data holding means 110, the similar set learning data holding means 150, the learning data holding means 210, and the similar set learning data holding means 250.

The image analysis devices 100 and 200 may each be implemented by hardware. For example, the image analysis device 100 may be implemented by circuitry including a hardware component such as LSI (Large Scale Integration) incorporating therein a program for achieving the functions shown in FIG. 1 or the functions shown in FIG. 5.

The image analysis devices 100 and 200 may each be implemented by software, by the CPU 101 shown in FIG. 9 executing a program for providing the functions of the components shown in FIG. 1 or the functions of the components shown in FIG. 5.

In the case where the image analysis device 100 or 200 is implemented by software, the CPU 101 loads a program stored in the auxiliary storage unit 104 into the main storage unit 102 and executes the program to control the operation of the image analysis device 100 or 200, thus implementing the functions by software.

The target discrimination device 300 shown in FIG. 3 may be implemented by hardware. The target discrimination device 300 may be implemented by software, by the CPU 101 shown in FIG. 9 executing a program for providing the functions of the components shown in FIG. 3.

All or part of the components may be implemented by general-purpose or dedicated circuitry, processors, or combinations thereof. They may be configured with a single chip, or configured with a plurality of chips connected via a bus. All or part of the components may be implemented by a combination of the above-mentioned circuitry or the like and program.

In the case where all or part of the components is implemented by a plurality of information processing devices, circuitry, or the like, the plurality of information processing devices, circuitry, or the like may be centralized or distributed. For example, the information processing devices, circuitry, or the like may be implemented in a form in which they are connected via a communication network, such as a client-and-server system or a cloud computing system.

Figure 10:
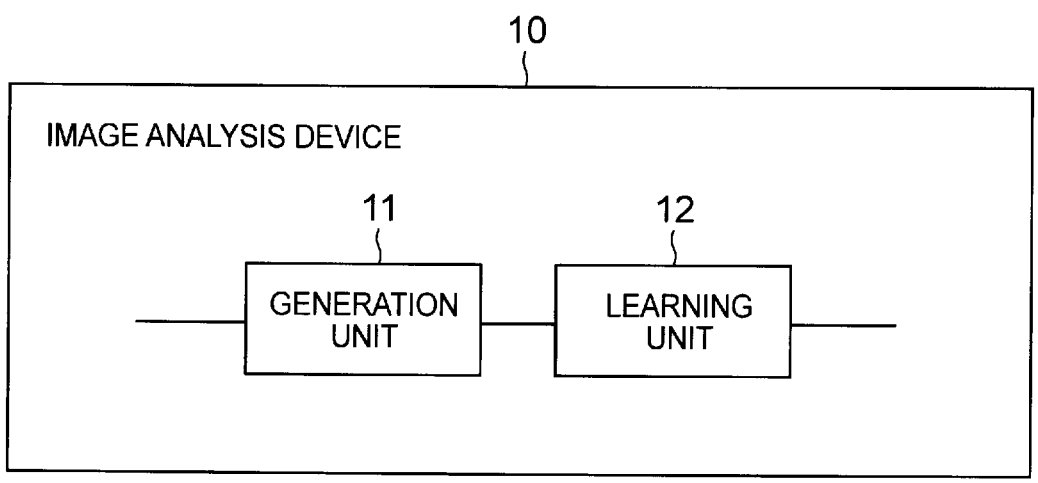
FIG. 10 is a block diagram showing an overview of an image analysis device according to the present invention.

An overview of the present invention will be described below. FIG. 10 is a block diagram showing an overview of an image analysis device according to the present invention. An image analysis device 10 according to the present invention includes: a generation unit 11 (e.g. the similar set generation means 240 and the similar set learning data holding means 250) which generates a similar set, which is a set of similar pieces of learning data selected from among a plurality of pieces of learning data, each including an image and information that represents an object to be recognized that is displayed in the image; and a learning unit 12 (e.g. the second feature value learning means 260) which uses the generated similar set to learn parameters (e.g. second feature value) for a predetermined recognition model that allow the predetermined recognition model to recognize the object to be recognized that is displayed in each image included in the generated similar set.

With such a structure, the image analysis device can recognize an object to be recognized displayed in an image more easily with high accuracy.

The image analysis device 10 may include a specifying unit (e.g. the attention region specifying means 270) which specifies a region used for recognition in the image included in each of the plurality of pieces of learning data, as a recognition region, and the learning unit 12 may perform the learning using a specified recognition region in each image included in the generated similar set.

With such a structure, the image analysis device can recognize the object to be recognized displayed in the image with higher accuracy.

The learning unit 12 may learn the parameter of the predetermined recognition model, excluding, from specified recognition regions in the images included in the generated similar set, a recognition region overlapping between the images.

With such a structure, the image analysis device can recognize the object to be recognized displayed in the image with higher accuracy.

The image analysis device 10 may include a determination unit (e.g. the similarity determination means 130 or 230) which determines similarity between the plurality of pieces of learning data, and the generation unit 11 may generate the similar set on the basis of the determined similarity.

With such a structure, the image analysis device can execute learning using, as input, a plurality of pieces of learning data having similarity higher than a designated value.

The image analysis device 10 may include an extraction unit (e.g. the first feature value extraction means 120 or 220) which extracts a feature value of the image included in each of the plurality of pieces of learning data, and the determination unit may determine the similarity between the plurality of pieces of learning data, on the basis of a distance between respective feature values extracted from the plurality of pieces of learning data.

With such a structure, the image analysis device can determine similarity between a plurality of pieces of learning data on the basis of feature values of images.

Each of the plurality of pieces of learning data may include information indicating a category to which the object to be recognized displayed in the image included in the piece of learning data belongs, and the determination unit may determine similarity between a plurality of categories to which respective objects to be recognized indicated by the plurality of pieces of learning data belong, on the basis of respective feature values extracted from the plurality of pieces of learning data.

With such a structure, the image analysis device can execute learning using, as input, a plurality of pieces of learning data in which respective objects to be recognized belong to similar categories.

The generation unit 11 may generate, as the similar set, a set of pieces of learning data in which objects to be recognized displayed in respective images belong to similar categories, and the learning unit 12 may learn the parameters for the predetermined recognition model that allow the predetermined recognition model to recognize a category to which each of the objects to be recognized included in the generated similar set belongs.

With such a structure, the image analysis device can recognize categories to which respective objects to be recognized displayed in similar images belong, with high accuracy.

The learning unit 12 may perform weighting so as to emphasize loss corresponding to an error only between similar categories during learning. The determination unit may determine similarity between a plurality of categories, on the basis of an integrated value of the resemblance to each category in category discrimination.

The image analysis device 10 may include a learning data holding unit (e.g. the learning data holding means 110 or 210) which holds learning data. The image analysis device 10 may include a similar set learning data holding unit (e.g. the similar set learning data holding means 150 or 250) which holds learning data that includes information indicating the similar set and is generated on the basis of the learning data held in the learning data holding unit and the similar set generated by the generation unit 11.

Although the present invention has been described with reference to the exemplary embodiments and examples, the present invention is not limited to the foregoing exemplary embodiments and examples. Various changes understandable by those skilled in the art can be made to the structures and details of the present invention within the scope of the present invention.

REFERENCE SIGNS LIST 10, 100, 200 image analysis device
11 generation unit
12 learning unit
101 CPU
102 main storage unit
103 communication unit 104 auxiliary storage unit
105 input unit
106 output unit
107 system bus
110, 210 learning data holding means
120, 220, 320 first feature value extraction means
130, 230 similarity determination means
140, 240 similar set generation means
150, 250 similar set learning data holding means
160, 260 second feature value learning means
270 attention region specifying means
300 target discrimination device
310 acquisition means
330 second feature value extraction means
340 integrated determination means

The invention claimed is:

1. An image analysis device comprising:
a memory storing instructions; and
one or more processors configured to execute the instructions to:
generates a similar set, which is a set of similar pieces of learning data selected from among a plurality of pieces of learning data, each including an image and information that represents an object to be recognized that is displayed in the image; and
uses the generated similar set to learn parameters for a predetermined recognition model that allow the predetermined recognition model to recognize the object to be recognized that is displayed in each image included in the generated similar set.

2. The image analysis device according to claim 1, wherein
the one or more processors is further configured to execute the instructions to:
specify a region used for recognition in the image included in each of the plurality of pieces of learning data, as a recognition region, and
perform the learning using a specified recognition region in each image included in the generated similar set.

3. The image analysis device according to claim 2, wherein
the one or more processors is further configured to execute the instructions to:
learn the parameter of the predetermined recognition model, excluding, from specified recognition regions in the images included in the generated similar set, a recognition region overlapping between the images.

4. The image analysis device according to claim 3, wherein
the one or more processors is further configured to execute the instructions to:
determine similarity between the plurality of pieces of learning data,
generate the similar set on the basis of the determined similarity.

5. The image analysis device according to claim 4, wherein
the one or more processors is further configured to execute the instructions to:
extract a feature value of the image included in each of the plurality of pieces of learning data, and
determine the similarity between the plurality of pieces of learning data, on the basis of a distance between respective feature values extracted from the plurality of pieces of learning data.

6. The image analysis device according to claim 4, wherein each of the plurality of pieces of learning data includes information indicating a category to which the object to be recognized displayed in the image included in the piece of learning data belongs, and
the one or more processors is further configured to execute the instructions to:
determine similarity between a plurality of categories to which respective objects to be recognized indicated by the plurality of pieces of learning data belong, on the basis of respective feature values extracted from the plurality of pieces of learning data.

7. The image analysis device according to claim 6, wherein
the one or more processors is further configured to execute the instructions to:
generate, as the similar set, a set of pieces of learning data in which objects to be recognized displayed in respective images belong to similar categories, and
learn the parameters for the predetermined recognition model that allow the predetermined recognition model to recognize a category to which each of the objects to be recognized included in the generated similar set belongs.

8. The image analysis device according to claim 2, wherein
the one or more processors is further configured to execute the instructions to:
determine similarity between the plurality of pieces of learning data, and
generate the similar set on the basis of the determined similarity.

9. The image analysis device according to claim 8, wherein
extract a feature value of the image included in each of the plurality of pieces of learning data, and
determine the similarity between the plurality of pieces of learning data, on the basis of a distance between respective feature values extracted from the plurality of pieces of learning data.

10. The image analysis device according to claim 8, wherein each of the plurality of pieces of learning data includes information indicating a category to which the object to be recognized displayed in the image included in the piece of learning data belongs, and
the one or more processors is further configured to execute the instructions to:
determine similarity between a plurality of categories to which respective objects to be recognized indicated by the plurality of pieces of learning data belong, on the basis of respective feature values extracted from the plurality of pieces of learning data.

11. The image analysis device according to claim 10, wherein the one or more processors is further configured to execute the instructions to:
generate, as the similar set, a set of pieces of learning data in which objects to be recognized displayed in respective images belong to similar categories, and
learn the parameters for the predetermined recognition model that allow the predetermined recognition model to recognize a category to which each of the objects to be recognized included in the generated similar set belongs.

12. The image analysis device according to claim 2, wherein
the one or more processors is further configured to execute the instructions to:

perform weighting so as to emphasize loss corresponding to an error only between similar categories during learning.

13. The image analysis device according to claim 1, wherein the one or more processors is further configured to execute the instructions to:

determine similarity between the plurality of pieces of learning data, and generate the similar set on the basis of the determined similarity.

14. The image analysis device according to claim 13, wherein the one or more processors is further configured to execute the instructions to:

extract a feature value of the image included in each of the plurality of pieces of learning data, and determine the similarity between the plurality of pieces of learning data, on the basis of a distance between respective feature values extracted from the plurality of pieces of learning data.

15. The image analysis device according to claim 13, wherein each of the plurality of pieces of learning data includes information indicating a category to which the object to be recognized displayed in the image included in the piece of learning data belongs, and the one or more processors is further configured to execute the instructions to:

determine similarity between a plurality of categories to which respective objects to be recognized indicated by the plurality of pieces of learning data belong, on the basis of respective feature values extracted from the plurality of pieces of learning data.

16. The image analysis device according to claim 15, wherein the one or more processors is further configured to execute the instructions to:

genenerate, as the similar set, a set of pieces of learning data in which objects to be recognized displayed in respective images belong to similar categories, and learn the parameters for the predetermined recognition model that allow the predetermined recognition model to recognize a category to which each of the objects to be recognized included in the generated similar set belongs.

17. The image analysis device according to claim 15, wherein the one or more processors is further configured to execute the instructions to:

determine similarity between a plurality of categories, on the basis of an integrated value of the resemblance to each category in category discrimination.

18. The image analysis device according to claim 1, wherein the one or more processors is further configured to execute the instructions to:

perform weighting so as to emphasize loss corresponding to an error only between similar categories during learning.

19. An image analysis method comprising:

generating a similar set, which is a set of similar pieces of learning data selected from among a plurality of pieces of learning data, each including an image and information that represents an object to be recognized that is displayed in the image; and using the generated similar set to learn parameters for a predetermined recognition model that allow the predetermined recognition model to recognize the object to be recognized that is displayed in each image included in the generated similar set.

20. A non-transitory computer-readable capturing medium having captured therein an image analysis program for causing a computer to execute:

a generation process of generating a similar set, which is a set of similar pieces of learning data selected from among a plurality of pieces of learning data, each including an image and information that represents an object to be recognized that is displayed in the image; and a learning process of using the generated similar set to learn parameters for a predetermined recognition model that allow the predetermined recognition model to recognize the object to be recognized that is displayed in each image included in the generated similar set.

* * * * *